US011986939B2

(12) United States Patent
Dittrich et al.

(10) Patent No.: US 11,986,939 B2
(45) Date of Patent: May 21, 2024

(54) FASTENER DRIVING TOOL

(71) Applicant: HILTI AKTIENGESELLSCHAFT, Schaan (LI)

(72) Inventors: Tilo Dittrich, Feldkirch (AT); Norbert Heeb, Buchs (CH); Kai Friewald, Feldkirch (AT)

(73) Assignee: HILTI AKTIENGESELLSCHAFT, Schaan (LI)

( * ) Notice: Subject to any disclaimer, the term of this patent is extended or adjusted under 35 U.S.C. 154(b) by 571 days.

(21) Appl. No.: 17/051,651

(22) PCT Filed: May 29, 2019

(86) PCT No.: PCT/EP2019/063918
§ 371 (c)(1),
(2) Date: Oct. 29, 2020

(87) PCT Pub. No.: WO2019/233841
PCT Pub. Date: Dec. 12, 2019

(65) Prior Publication Data

US 2021/0229251 A1 Jul. 29, 2021

(30) Foreign Application Priority Data

Jun. 6, 2018 (EP) .................................... 18176196

(51) Int. Cl.
*B25C 1/06* (2006.01)
*B25C 5/15* (2006.01)

(52) U.S. Cl.
CPC . *B25C 1/06* (2013.01); *B25C 5/15* (2013.01)

(58) Field of Classification Search
CPC .................................... B25C 1/06; B25C 5/15
See application file for complete search history.

(56) References Cited

U.S. PATENT DOCUMENTS 6,830,173 B2 * 12/2004 Barber ...................... B25C 1/06 173/217
2011/0303718 A1 * 12/2011 Spasov .................. B25F 5/006 165/287

(Continued)

FOREIGN PATENT DOCUMENTS

DE 2330958 A1 1/1974
DE 2238440 A1 2/1974

(Continued)

OTHER PUBLICATIONS

International Bureau, International Search Report in International Application No. PCT/EP2019/063918, dated Jun. 26, 2019.

*Primary Examiner* — Thomas M Wittenschlaeger
*Assistant Examiner* — Katie L Gerth
(74) *Attorney, Agent, or Firm* — Leydig, Voit & Mayer, Ltd.

(57) ABSTRACT

A setting tool for driving fastening elements into a substrate comprises a holder for holding a fastening element; a drive-in element for transferring a fastening element held in the holder into the substrate along a setting axis; and, a drive for driving the drive-in element toward the fastening element along the setting axis, wherein the drive comprises an electrical capacitor; a squirrel-cage rotor arranged on the drive-in element; and, an excitation coil, which during rapid discharge of the capacitor is flowed through by current and generates a magnetic field that accelerates the drive-in element toward the fastening element, and wherein the setting tool has a control unit, which is suitable for carrying out a fuse discharge of the capacitor during which current does not flow through the excitation coil.

19 Claims, 4 Drawing Sheets

(56) References Cited

U.S. PATENT DOCUMENTS

| | | | | |
|---|---|---|---|---|
| 2013/0334277 | A1* | 12/2013 | Shima | B25C 1/06 318/114 |
| 2016/0144496 | A1* | 5/2016 | Raggl | B25C 1/10 29/432 |
| 2020/0130156 | A1* | 4/2020 | Takeuchi | H02P 29/60 |

FOREIGN PATENT DOCUMENTS

| | | | |
|---|---|---|---|
| JP | S49-19470 | A | 2/1974 |
| JP | 2012-179661 | A | 9/2012 |
| WO | WO 2012/118220 | A2 | 9/2012 |

* cited by examiner

FASTENER DRIVING TOOL

CROSS-REFERENCE TO RELATED APPLICATIONS

This patent application is the U.S. National Stage of International Patent Application No. PCT/EP2019/063918, filed May 29, 2019, which claims the benefit of European Patent Application No. 18176196.6, filed Jun. 6, 2018, which are each incorporated by reference.

The present invention relates to a setting tool for driving fastening elements into a substrate.

Such setting tools usually have a holder for a fastening element, from which a fastening element held therein is transferred into the substrate along a setting axis. For this, a drive-in element is driven toward the fastening element along the setting axis by a drive.

U.S. Pat. No. 6,830,173 B2 discloses a setting tool with a drive for a drive-in element. The drive has an electrical capacitor and a coil. For driving the drive-in element, the capacitor is discharged via the coil, whereby a Lorentz force acts on the drive-in element, so that the drive-in element is moved toward a nail.

The object of the present invention is to provide a setting tool of the aforementioned type with which high efficiency and/or good setting quality are ensured.

The object is achieved by a setting tool for driving fastening elements into a substrate, comprising a holder, which is provided for holding a fastening element, a drive-in element, which is provided for transferring a fastening element held in the holder into the substrate along a setting axis, a drive, which is provided for driving the drive-in element toward the fastening element along the setting axis, wherein the drive comprises an electrical capacitor, a squirrel-cage rotor arranged on the drive-in element and an excitation coil, which during rapid discharge of the capacitor is flowed through by current and generates a magnetic field that accelerates the drive-in element toward the fastening element, and wherein the setting tool has a control unit, which is suitable for carrying out a fuse discharge of the capacitor during which current does not flow through the excitation coil. This makes it possible to discharge the capacitor without ejecting a fastening element from the setting tool. The setting tool can in this case preferably be used in a hand-held manner. Alternatively, the setting tool can be used in a stationary or semi-stationary manner.

In the context of the invention, a capacitor should be understood as meaning an electrical component that stores electrical charge and the associated energy in an electrical field. In particular, a capacitor has two electrically conducting electrodes, between which the electrical field builds up when the electrodes are electrically charged differently. In the context of the invention, a fastening element should be understood as meaning for example a nail, a pin, a clamp, a clip, a stud, in particular a threaded bolt, or the like.

An advantageous embodiment is characterized in that the control unit can be operated in a normal mode and in a backup mode, and wherein the control unit is suitable for performing a quick discharge in the normal mode and for performing the fuse discharge in the backup mode.

An advantageous embodiment is characterized in that the drive has a switching circuit, which comprises a discharge switch, the control unit being suitable for closing the discharge switch in the normal mode in order to bring about the rapid discharge, and the control unit comprising a fuse switch and being suitable for closing the fuse switch in the backup mode in order to bring about the fuse discharge.

An advantageous embodiment is characterized in that the setting tool has a detection means for detecting a state parameter of the setting tool, wherein the control unit is intended to go into backup mode in dependence on the detected state parameter.

An advantageous embodiment is characterized in that the setting tool has a means for detecting a period of time during which the capacitor is already electrically charged, wherein the detected state parameter comprises the detected period of time. The control unit preferably has the means for detecting the period of time.

An advantageous embodiment is characterized in that the setting tool has a means for detecting a mechanical load variable of the setting tool, wherein the detected state parameter comprises the detected load variable of the setting tool. The detected mechanical load variable is preferably an acceleration of the setting tool, particularly preferably a recoil of the setting tool while a fastening element is being driven into the substrate.

An advantageous embodiment is characterized in that the setting tool has a means for detecting a charging voltage of the capacitor, wherein the detected state parameter comprises the charging voltage of the capacitor. The control unit is preferably intended to go into backup mode when the charging voltage of the capacitor exceeds a predetermined limit voltage.

An advantageous embodiment is characterized in that the setting tool has a means for detecting a temperature of a surrounding area and/or of the setting tool, the detected state parameter comprising the detected temperature. The detected temperature is preferably a temperature of the excitation coil.

An advantageous embodiment is characterized in that the setting tool has a means for detecting a removal of a component of the setting tool, the detected state parameter being the absence of the component of the setting tool. The means is preferably suitable for detecting a removal of a housing part or an electric battery of the setting tool.

An advantageous embodiment is characterized in that the control unit has an electrical resistor which is flowed through with current during the fuse discharge of the capacitor. The electrical resistor preferably comprises a resistor network.

An advantageous embodiment is characterized in that the setting tool has an electric battery which is flowed through with current and charged during the fuse discharge of the capacitor. The control unit preferably comprises a bidirectional switching converter, which converts a battery current into a capacitor charging current for a charging of the capacitor and converts a discharging current of the capacitor into a battery charging current for a fuse discharge of the capacitor. The bidirectional switching converter particularly preferably comprises one or more rectifier switches, which are closed in order to bring about and control the fuse discharge.

An advantageous embodiment is characterized in that the control unit is suitable for controlling the amount of energy of the current flowing through the excitation coil during the rapid discharge of the capacitor in dependence on the detected state parameter.

An advantageous embodiment is characterized in that the capacitor is charged with a charging voltage at the beginning of the rapid discharge, the control unit being suitable for controlling the charging voltage. The capacitor is preferably charged in a charging process before the rapid discharge, the charging process being controlled by the control unit.

The invention is represented in a number of exemplary embodiments in the drawings, in which.

Figure 1:
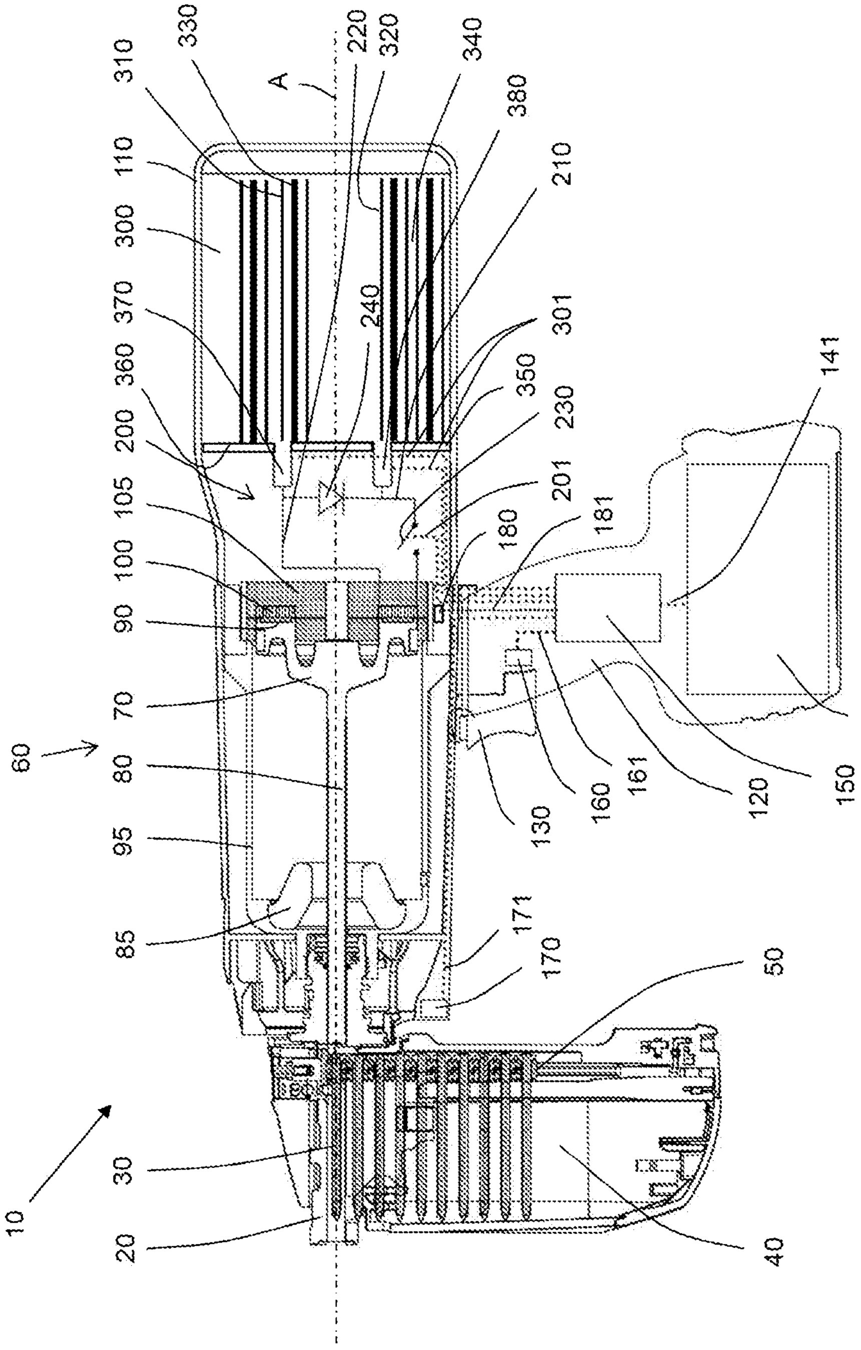
FIG. 1 shows a longitudinal section through a setting tool.

FIG. 1 illustrates a hand-held setting tool 10 for driving fastening elements into a substrate that is not shown. The setting tool 10 has a holder 20 formed as a stud guide, in which a fastening element 30, which is formed as a nail, is held in order to be driven into the substrate along a setting axis A (on the left in FIG. 1). For the purpose of supplying fastening elements to the holder, the setting tool 10 comprises a magazine 40 in which the fastening elements are held in store individually or in the form of a fastening element strip 50 and are transported to the holder 20 one by one. To this end, the magazine 40 has a spring-loaded feed element, not specifically denoted. The setting tool 10 has a drive-in element 60, which comprises a piston plate 70 and a piston rod 80. The drive-in element 60 is provided for transferring the fastening element 30 out of the holder 20 along the setting axis A into the substrate. In the process, the drive-in element 60 is guided with its piston plate 70 in a guide cylinder 95 along the setting axis A.

The drive-in element 60 is, for its part, driven by a drive, which comprises a squirrel-cage rotor 90 arranged on the piston plate 70, an excitation coil 100, a soft-magnetic frame 105, a switching circuit 200 and a capacitor 300 with an internal resistance of 5 mohms. The squirrel-cage rotor 90 consists of a preferably ring-like, particularly preferably circular ring-like, element with a low electrical resistance, for example made of copper, and is fastened, for example soldered, welded, adhesively bonded, clamped or connected in a form-fitting manner, to the piston plate 70 on the side of the piston plate 70 that faces away from the holder 20. In exemplary embodiments which are not shown, the piston plate itself is formed as a squirrel-cage rotor. The switching circuit 200 is provided for causing rapid electrical discharging of the previously charged capacitor 300 and conducting the thereby flowing discharge current through the excitation coil 100, which is embedded in the frame 105. The frame preferably has a saturation flux density of at least 1.0 T and/or an effective specific electrical conductivity of at most $10^6$ S/m, so that a magnetic field generated by the excitation coil 100 is intensified by the frame 105 and eddy currents in the frame 105 are suppressed.

In a ready-to-set position of the drive-in element 60 (FIG. 1), the drive-in element 60 enters with the piston plate 70 a ring-like recess, not specifically denoted, of the frame 105 such that the squirrel-cage rotor 90 is arranged at a small distance from the excitation coil 100. As a result, an excitation magnetic field, which is generated by a change in an electrical excitation current flowing through the excitation coil, passes through the squirrel-cage rotor 90 and, for its part, induces in the squirrel-cage rotor 90 a secondary electrical current, which circulates in a ring-like manner. This secondary current, which builds up and therefore changes, in turn generates a secondary magnetic field, which opposes the excitation magnetic field, as a result of which the squirrel-cage rotor 90 is subject to a Lorentz force, which is repelled by the excitation coil 100 and drives the drive-in element 60 toward the holder 20 and also the fastening element 30 held therein.

The setting tool 10 further comprises a housing 110, in which the drive is held, a handle 120 with an operating element 130 formed as a trigger, an electrical energy store 140 formed as a rechargeable battery, a control unit 150, a tripping switch 160, a contact-pressure switch 170, a means for detecting a temperature of the excitation coil 100, formed as a temperature sensor 180 arranged on the frame 105, and electrical connecting lines 141, 161, 171, 181, 201, 301, which connect the control unit 150 to the electrical energy store 140, to the tripping switch 160, to the contact-pressure switch 170, to the temperature sensor 180, to the switching circuit 200 and, respectively, to the capacitor 300. In exemplary embodiments which are not shown, the setting tool 10 is supplied with electrical energy by means of a power cable instead of the electrical energy store 140 or in addition to the electrical energy store 140. The control unit comprises electronic components, preferably interconnected on a printed circuit board to form one or more electrical control circuits, in particular one or more microprocessors.

When the setting tool 10 is pressed against a substrate that is not shown (on the left in FIG. 1), a contact-pressure element, not specifically denoted, operates the contact-pressure switch 170, which as a result transmits a contact-pressure signal to the control unit 150 by means of the connecting line 171. This triggers the control unit 150 to initiate a capacitor charging process, in which electrical energy is conducted from the electrical energy store 140 to the control unit 150 by means of the connecting line 141 and from the control unit 150 to the capacitor 300 by means of the connecting lines 301, in order to charge the capacitor 300. To this end, the control unit 150 comprises a switching converter, not specifically denoted, which converts the electric current from the electrical energy store 140 into a suitable charge current for the capacitor 300. When the capacitor 300 is charged and the drive-in element 60 is in its ready-to-set position illustrated in FIG. 1, the setting tool 10 is in a ready-to-set state. Since charging of the capacitor 300 is only implemented by the setting tool 10 pressing against the substrate, to increase the safety of people in the area a setting process is only made possible when the setting tool 10 is pressed against the substrate. In exemplary embodiments which are not shown, the control unit already initiates the capacitor charging process when the setting tool is switched on or when the setting tool is lifted off the substrate or when a preceding driving-in process is completed.

When the operating element 130 is operated, for example by being pulled using the index finger of the hand which is holding the handle 120, with the setting tool 10 in the ready-to-set state, the operating element 130 operates the tripping switch 160, which as a result transmits a tripping signal to the control unit 150 by means of the connecting line 161. This triggers the control unit 150 to initiate a capacitor discharging process, in which electrical energy stored in the capacitor 300 is conducted from the capacitor 300 to the excitation coil 100 by means of the switching circuit 200 by way of the capacitor 300 being discharged.

To this end, the switching circuit 200 schematically illustrated in FIG. 1 comprises two discharge lines 210, 220, which connect the capacitor 300 to the excitation coil 200 and at least one discharge line 210 of which is interrupted by a normally open discharge switch 230. The switching circuit 200 forms an electrical oscillating circuit with the excitation coil 100 and the capacitor 300. Oscillation of this oscillating circuit back and forth and/or negative charging of the capacitor 300 may potentially have an adverse effect on the efficiency of the drive, but can be suppressed with the aid of a free-wheeling diode 240. The discharge lines 210, 220 are electrically connected, for example by soldering, welding, screwing, clamping or form-fitting connection, to in each case one electrode 310, 320 of the capacitor 300 by means of electrical contacts 370, 380 of the capacitor 300 which are arranged on an end side 360 of the capacitor 300 that faces the holder 20. The discharge switch 230 is preferably suitable for switching a discharge current with a high current intensity and is formed for example as a thyristor. In addition, the discharge lines 210, 220 are at a small distance from one another, so that a parasitic magnetic field induced by them is as low as possible. For example, the discharge lines 210, 220 are combined to form a busbar and are held together by a suitable means, for example a retaining device or a clamp. In exemplary embodiments which are not shown, the free-wheeling diode is connected electrically in parallel with the discharge switch. In further exemplary embodiments which are not shown, there is no free-wheeling diode provided in the circuit.

For the purpose of initiating the capacitor discharging process, the control unit 150 closes the discharge switch 230 by means of the connecting line 201, as a result of which a discharge current of the capacitor 300 with a high current intensity flows through the excitation coil 100. The rapidly rising discharge current induces an excitation magnetic field, which passes through the squirrel-cage rotor 90 and, for its part, induces in the squirrel-cage rotor 90 a secondary electric current, which circulates in a ring-like manner. This secondary current which builds up in turn generates a secondary magnetic field, which opposes the excitation magnetic field, as a result of which the squirrel-cage rotor 90 is subject to a Lorentz force, which is repelled by the excitation coil 100 and drives the drive-in element 60 toward the holder 20 and also the fastening element 30 held therein. As soon as the piston rod 80 of the drive-in element 60 meets a head, not specifically denoted, of the fastening element 30, the fastening element 30 is driven into the substrate by the drive-in element 60. Excess kinetic energy of the drive-in element 60 is absorbed by a braking element 85 made of a spring-elastic and/or damping material, for example rubber, by way of the drive-in element 60 moving with the piston plate 70 against the brake element 85 and being braked by the latter until it comes to a standstill. The drive-in element 60 is then reset to the ready-to-set position by a resetting device that is not specifically denoted.

The capacitor 300, in particular its center of gravity, is arranged behind the drive-in element 60 on the setting axis A, whereas the holder 20 is arranged in front of the drive-in element 60. Therefore, with respect to the setting axis A, the capacitor 300 is arranged in an axially offset manner in relation to the drive-in element 60 and in a radially overlapping manner with the drive-in element 60. As a result, on the one hand a small length of the discharge lines 210, 220 can be realized, as a result of which their resistances can be reduced, and therefore an efficiency of the drive can be increased. On the other hand, a small distance between a center of gravity of the setting tool 10 and the setting axis A can be realized. As a result, tilting moments in the event of recoil of the setting tool 10 during a driving-in process are small. In an exemplary embodiment which is not shown, the capacitor is arranged around the drive-in element.

The electrodes 310, 320 are arranged on opposite sides of a carrier film 330 which is wound around a winding axis, for example by metallization of the carrier film 330, in particular by being vapor-deposited, wherein the winding axis coincides with the setting axis A. In exemplary embodiments which are not shown, the carrier film with the electrodes is wound around the winding axis such that a passage along the winding axis remains. In particular, in this case the capacitor is for example arranged around the setting axis. The carrier film 330 has at a charging voltage of the capacitor 300 of 1500 V a film thickness of between 2.5 μm and 4.8 μm and at a charging voltage of the capacitor 300 of 3000 V a film thickness of for example 9.6 μm. In exemplary embodiments which are not shown, the carrier film is for its part made up of two or more individual films which are arranged as layers one on top of the other. The electrodes 310, 320 have a sheet resistance of 50 ohms/□.

A surface of the capacitor 300 has the form of a cylinder, in particular a circular cylinder, the cylinder axis of which coincides with the setting axis A. A height of this cylinder in the direction of the winding axis is substantially the same size as its diameter, measured perpendicularly to the winding axis. On account of a small ratio of height to diameter of the cylinder, a low internal resistance for a relatively high capacitance of the capacitor 300 and, not least, a compact construction of the setting tool 10 are achieved. A low internal resistance of the capacitor 300 is also achieved by a large line cross section of the electrodes 310, 320, in particular by a high layer thickness of the electrodes 310, 320, wherein the effects of the layer thickness on a self-healing effect and/or on a service life of the capacitor 300 should be taken into consideration.

The capacitor 300 is mounted on the rest of the setting tool 10 in a manner damped by means of a damping element 350. The damping element 350 damps movements of the capacitor 300 relative to the rest of the setting tool 10 along the setting axis A. The damping element 350 is arranged on the end side 360 of the capacitor 300 and completely covers the end side 360. As a result, the individual windings of the carrier film 330 are subject to uniform loading by recoil of the setting tool 10. In this case, the electrical contacts 370, 380 protrude from the end surface 360 and pass through the damping element 350. For this purpose, the damping element 350 in each case has a clearance through which the electrical contacts 370, 380 protrude. The connecting lines 301 respectively have a strain-relief and/or expansion loop, not illustrated in any detail, for compensating for relative movements between the capacitor 300 and the rest of the setting tool 10. In exemplary embodiments which are not shown, a further damping element is arranged on the capacitor, for example on the end side of the capacitor that faces away from the holder. The capacitor is then preferably clamped between two damping elements, that is to say the damping elements bear against the capacitor with prestress. In further exemplary embodiments which are not shown, the connecting lines have a rigidity which continuously decreases as the distance from the capacitor increases.

Figure 2:
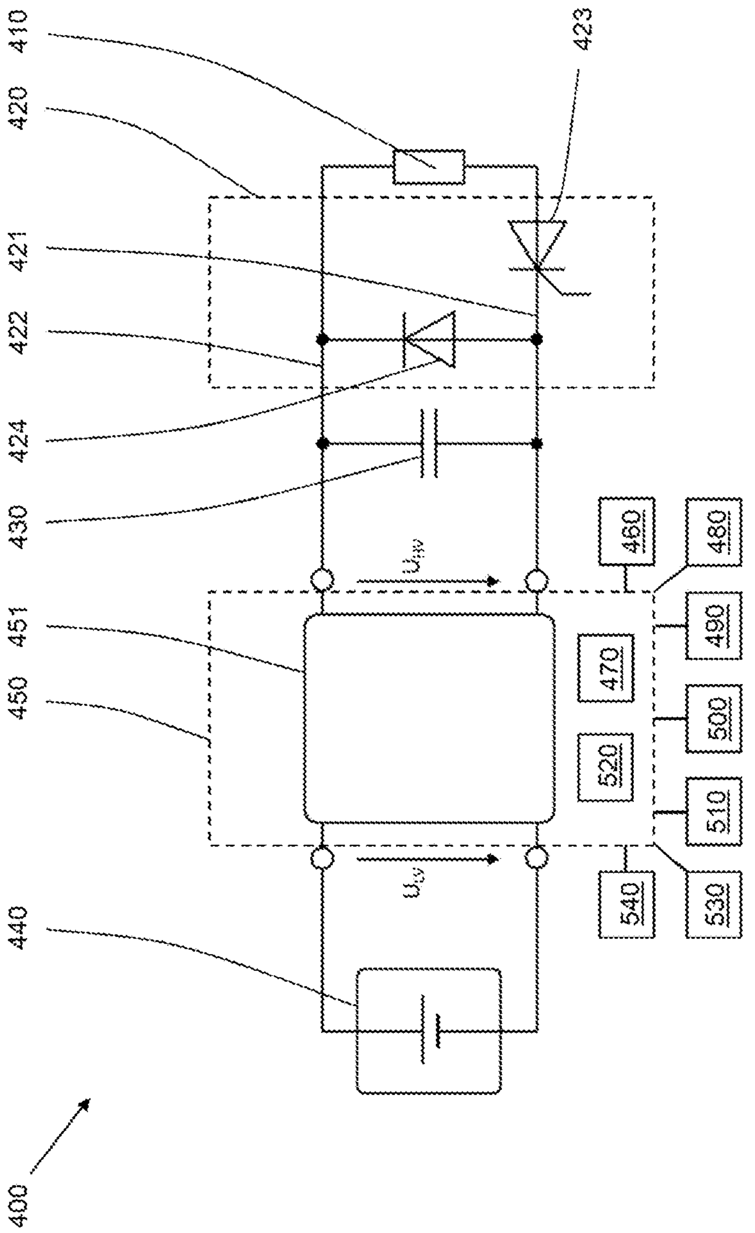
FIG. 2 shows a circuit diagram of a setting tool.

FIG. 2 illustrates an electrical circuit diagram 400 of a setting tool that is not shown any further, for driving fastening elements into a substrate that is not shown. The setting device has a housing, not shown, a handle, not shown, with an operating element, a holder, not shown, a magazine, not shown, a driving-in element, not shown, and a drive for the drive-in element. The drive comprises a squirrel-cage rotor, not shown, arranged on the drive-in element, an excitation coil 410, a soft-magnetic frame, not shown, a switching circuit 420, a capacitor 430, an electrical energy store 440 designed as a rechargeable battery, and a control unit 450 with a switching converter 451 designed for example as a DC/DC converter. The switching converter 451 has a low-voltage side $U_{LV}$, electrically connected to the electrical energy store 440, and a high-voltage side $U_{HV}$, electrically connected to the capacitor 430.

The switching circuit 420 is provided for causing rapid electrical discharging of the previously charged capacitor 430 and conducting the thereby flowing discharge current through the excitation coil 410. To this end, the switching circuit 420 comprises two discharge lines 421, 422, which connect the capacitor 430 to the excitation coil 420 and at least one discharge line 421 of which is interrupted by a normally open discharge switch 423. A freewheeling diode 424 prevents excessive oscillation back and forth of an oscillating circuit formed by the switching circuit 420 with the excitation coil 410 and the capacitor 430 and negative charging of the capacitor 430.

When the setting tool is pressed against the substrate, the control unit 450 initiates a capacitor charging process, in which electrical energy is conducted from the electrical energy store 440 to the switching converter 451 of the control unit 450 and from the switching converter 451 to the capacitor 430 in order to charge the capacitor 430. In the process, the switching converter 451 converts the electric current from the electrical energy store 440, at an electrical voltage of for example 22 V, into a suitable charging current for the capacitor 430, at an electrical voltage of for example 1500 V.

Triggered by an actuation of the actuating element that is not shown, the control unit 450 initiates a capacitor discharging process, in which electrical energy stored in the capacitor 430 is conducted from the capacitor 430 to the excitation coil 410 by means of the switching circuit 420 by the capacitor 430 being discharged. To initiate the capacitor discharging process, the control unit 450 closes the discharge switch 423 by means of a control line that is not shown, as a result of which a discharge current of the capacitor 430 flows through the excitation coil 410 with a high current intensity. As a result, the squirrel-cage rotor, not shown, is subject to a Lorentz force, which is repelled by the excitation coil 410 and drives the drive-in element. The drive-in element is reset to a ready-to-set position by a resetting device that is not shown.

An amount of energy of the current flowing through the excitation coil 410 during the rapid discharge of the capacitor 430 is controlled, in particular steplessly, by the control unit 450, in that a charging voltage ($U_{HV}$) applied to the capacitor 430 is set during and/or at the end of the capacitor charging process and before the beginning of the rapid discharge. An electrical energy stored in the charged capacitor 430, and thus also the amount of energy of the current flowing through the excitation coil 410 during the rapid discharge of the capacitor 430, can be controlled in proportion to the charging voltage and thus by means of the charging voltage. The capacitor is charged during the capacitor charging process until the charging voltage $U_{HV}$ has reached a setpoint value. The charging current is then switched off. If the charging voltage decreases before the rapid discharge, for example due to parasitic effects, the charging current is switched on again until the charging voltage $U_{HV}$ has reached the setpoint value again.

The control unit 450 controls the amount of energy of the current flowing through the excitation coil 410 during the rapid discharge of the capacitor 430 in dependence on a number of control variables. For this purpose, the setting tool comprises a means designed as a temperature sensor 460 for detecting a temperature of the excitation coil 410 and a means for detecting a capacitance of the capacitor, which is designed for example as a calculation program 470 and calculates the capacitance of the capacitor from a profile of a current intensity and an electrical voltage of the charging current during the capacitor charging process. The setting tool further comprises a means designed as an acceleration sensor 480 for detecting a mechanical load variable of the setting tool. The setting tool further comprises a means for detecting a driving depth of the fastening element into the substrate, which comprises a proximity sensor 490, for example an optical, capacitive or inductive proximity sensor 490, which comprises a reversing position of the drive-in element that is not shown. The setting tool further comprises a means for detecting a speed of the drive-in element, which has a means designed as a first proximity sensor 500 for detecting a first point in time, at which the drive-in element passes a first position during its movement toward the fastening element, a means designed as a second proximity sensor 510 for detecting a second point in time, at which the drive-in element passes a second position during its movement toward the fastening element, and a means designed as a calculation program 520 for detecting a time difference between the first point in time and the second point in time. The setting tool further comprises an operating element 530, which can be adjusted by a user, and a means designed as a barcode reader 540 for detecting a characteristic variable of a fastening element to be driven in.

The control variables in dependence on which the control unit 450 controls the amount of energy of the current flowing through the excitation coil 410 during the rapid discharge of the capacitor 430 comprise the temperature detected by the temperature sensor 460 and/or the capacitance of the capacitor calculated by the calculation program 470 and/or the load variable of the setting tool detected by the acceleration sensor 480 and/or the driving-in depth of the fastening element detected by the proximity sensor 490 and/or the speed of the drive-in element calculated by the calculation program 520 and/or the adjustment of the operating element 530 adjusted by the user and/or the characteristic variable of the fastening element detected by the barcode reader 540.

Otherwise, the construction and the operating principle of the setting tool coincide substantially with the setting tool 10 shown in FIG. 1.

Figure 3:
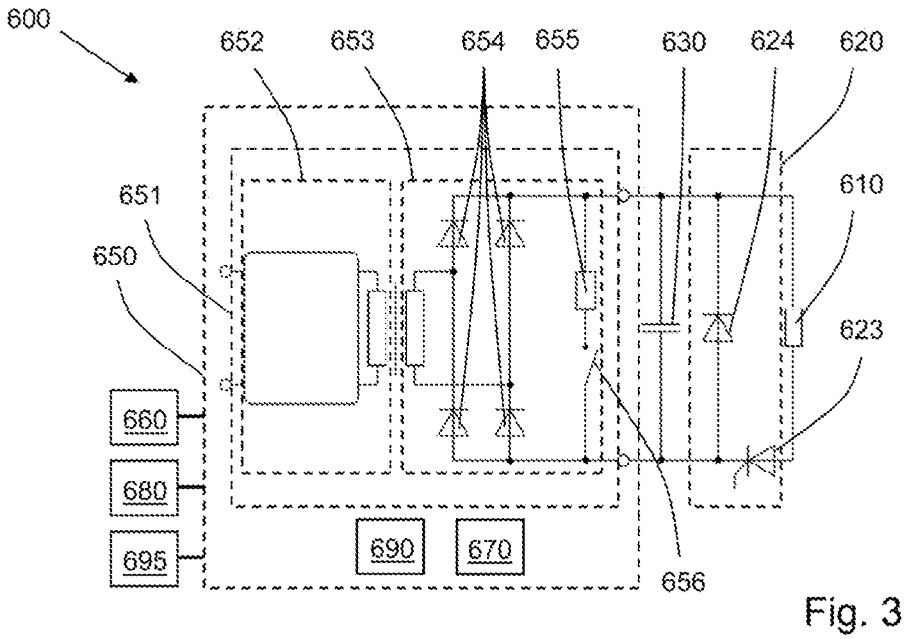
FIG. 3 shows a further circuit diagram of a setting tool.

FIG. 3 illustrates a further electrical circuit diagram 600 of a setting tool that is not shown any further, for driving fastening elements into a substrate that is not shown. The setting tool has a drive-in element and a drive for the drive-in element. The drive comprises a squirrel-cage rotor, not shown, arranged on the drive-in element, an excitation coil 610, a soft-magnetic frame, not shown, a switching circuit 620 with a discharge switch 623 and a free-wheeling diode 624, a capacitor 630, an electrical energy store, not shown, and a control unit 650 with a switching converter 651 designed for example as a DC/DC converter. The switching converter 651 has a low-voltage side 652 electrically connected to the electrical energy store and a high-voltage side 653 electrically connected to the capacitor 630 with a plurality of, for example four, rectifier diodes 654.

The control unit 650 can be operated in a normal mode and in a backup mode. When the setting tool is pressed against the substrate while the control unit 650 is operating in normal mode, the control unit 650 initiates a capacitor charging process, in which electrical energy is conducted from the electrical energy store to the switching converter 651 of the control unit 650 and from the switching converter 651 to the capacitor 630 in order to charge the capacitor 630. In order to accelerate the drive-in element toward a fastening element, the control unit 650 initiates a capacitor rapid discharging process, in which the electrical energy stored in the capacitor 630 is conducted by means of the switching circuit 620 from the capacitor 630 to the excitation coil 610 by the capacitor 630 being discharged. To initiate the capacitor discharging process, the control unit 650 closes the discharge switch 623 by means of a control line that is not shown.

When the control unit 650 goes into the backup mode, the control unit 650 initiates a fuse discharge of the capacitor 630, in which the excitation coil 610 is not flowed through with current, so that no fastening element is ejected from the setting tool. For this purpose, the control unit 650, in particular the switching converter 651, has a resistor 655 in the form of a resistor network and a fuse switch 656 connected in series with the resistor 655. The resistor 655 and the fuse switch 656 form a fuse circuit with the capacitor 630. To initiate the fuse discharge, the control unit 650 closes the fuse switch 656 by means of a control line that is not shown. This closes the fuse circuit, so that a fuse discharge current flows out of the capacitor 630 through the resistor 655. The electrical energy stored in the charged capacitor is then dissipated in the resistor 655, with the resistor 655 heating up.

In dependence on a number of state parameters, the control unit 650 goes into backup mode. For this purpose, the setting tool comprises a means formed as a temperature sensor 660 for detecting a temperature of the excitation coil 610 and a means for detecting a charging voltage of the capacitor 630, which is formed for example as a voltmeter 670. Furthermore, the setting tool comprises a means designed as an acceleration sensor 680 for detecting a mechanical load variable of the setting tool. Furthermore, the setting tool, in particular the control unit 650, comprises a means for detecting a period of time during which the capacitor 630 is already electrically charged, the means for detecting the period of time being formed as a calculation program 690. Furthermore, the setting tool comprises a means formed as a contact sensor 695 for detecting a removal of a housing part or the electric battery of the setting tool. This detects for example when the housing of the setting tool is opened. In exemplary embodiments which are not shown, a means for detecting a removal of the electric battery is formed as a voltmeter, which measures an electrical voltage of the battery. As soon as the measured voltage drops to 0 V, this is detected as removal of the battery.

The state parameters in dependence on which the control unit 650 goes into the backup mode include the temperature detected by the temperature sensor 660 and/or the charging voltage of the capacitor 630 detected by the voltmeter 670 and/or the load variable of the setting tool detected by the acceleration sensor 680 and/or the period of time during which the capacitor 630 is already electrically charged, calculated by the calculation program 690, and/or a removal of a housing part or the battery detected by the contact sensor 695. The control unit 650 is provided for example for going into backup mode when the temperature measured by the temperature sensor 660 exceeds a predetermined maximum temperature value and/or the charging voltage of the capacitor 660 detected by the voltmeter 670 exceeds a predetermined limit voltage and/or the acceleration detected by the acceleration sensor 680 exceeds a predetermined maximum acceleration value and/or the period of time during which the capacitor 630 is already electrically charged, calculated by the calculation program 690, exceeds a predetermined maximum period of time and/or a removal of a housing part or the battery is detected by the contact sensor 695.

Otherwise, the construction and the operating principle of the setting tool coincide substantially with the setting tool 10 shown in FIG. 1 and/or FIG. 2.

Figure 4:
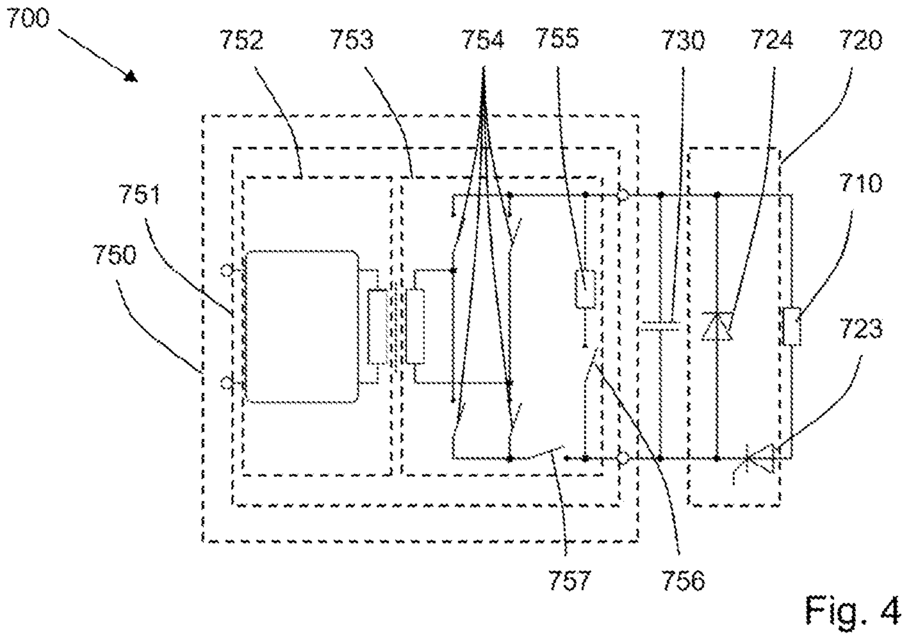
FIG. 4 shows a further circuit diagram of a setting tool.

FIG. 4 illustrates a further electrical circuit diagram 700 of a setting tool that is not shown any further, for driving fastening elements into a substrate that is not shown. The setting tool has a drive-in element and a drive for the drive-in element. The drive comprises an excitation coil 710, a switching circuit 720 with a discharge switch 723 and a free-wheeling diode 724, a capacitor 730 and a control unit 750 with a switching converter 751. The switching converter 751 has a low-voltage side 752 and a high-voltage side 753 with a number of, for example four, rectifier switches 754, a resistor 755, a fuse switch 756 and a charging switch 757. In order to rectify the charging current for the capacitor 730, the control unit 750 opens and closes the rectifier switches 754 crosswise in pairs with the charging switch 757 closed. As soon as the capacitor 730 is charged, the control unit 750 opens the charging switch 757, so that the capacitor does not discharge via the switching converter 751.

Otherwise, the construction and the operating principle of the setting tool coincide substantially with the setting tool shown in FIG. 1 and/or FIG. 2 and/or FIG. 3.

Figure 5:
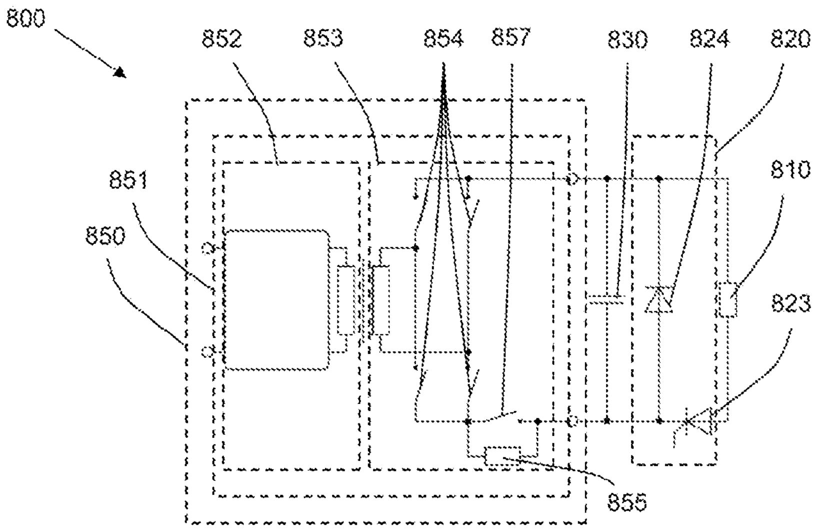
FIG. 5 shows a further circuit diagram of a setting tool.

FIG. 5 illustrates a further electrical circuit diagram 800 of a setting tool that is not shown any further, for driving fastening elements into a substrate that is not shown. The setting tool has a drive-in element and a drive for the drive-in element. The drive comprises an excitation coil 810, a switching circuit 820 with a discharge switch 823 and a free-wheeling diode 824, a capacitor 830 and a control unit 850 with a switching converter 851. The switching converter 851 has a low-voltage side 852 and a high-voltage side 853 with four rectifier switches 854, a resistor 855 and a charging switch 857.

When the control unit 850 goes into backup mode, the control unit 850 initiates a fuse discharge of the capacitor 830, in which the control unit 850 closes at least two of the rectifier switches 854, which are connected in series, preferably all of the rectifier switches 854, by means of control lines that are not shown. This closes a fuse circuit formed by the capacitor 830, the resistor 855 and the rectifier switches 854, so that a fuse discharge current flows out of the capacitor 830 through the resistor 855. The rectifier switches 854 thus form a fuse switch. The charging switch 857 connected in parallel with the resistor 855 remains open. The electrical energy stored in the charged capacitor is then dissipated in the resistor 855.

Otherwise, the construction and the operating principle of the setting tool coincide substantially with the setting tool shown in FIG. 1 and/or FIG. 2 and/or FIG. 3 and/or FIG. 4.

Figure 6:
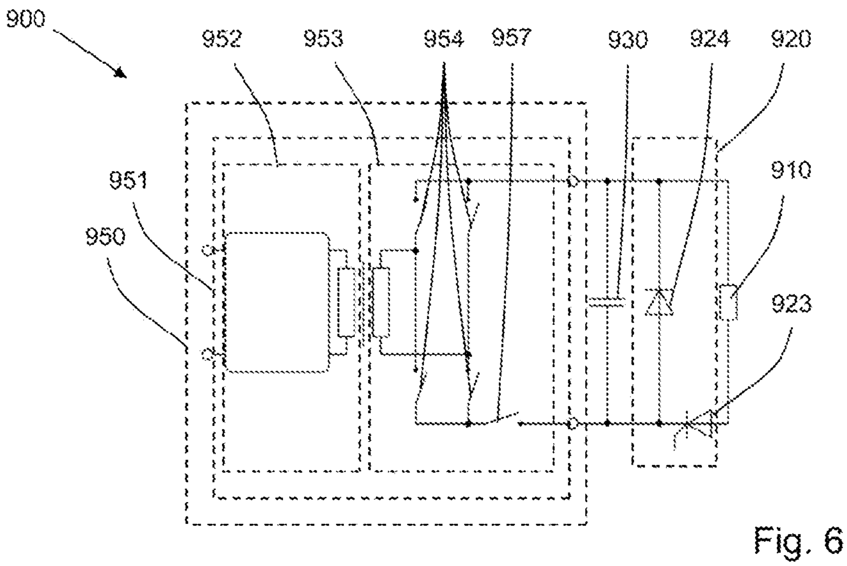
FIG. 6 shows a further circuit diagram of a setting tool.

FIG. 6 illustrates a further electrical circuit diagram 900 of a setting tool that is not shown any further, for driving fastening elements into a substrate that is not shown. The setting tool has a drive-in element and a drive for the drive-in element. The drive comprises an excitation coil 910, a switching circuit 920 with a discharge switch 923 and a free-wheeling diode 924, a capacitor 930 and a control unit 950 with a switching converter 951. The switching converter 951 has a low-voltage side 952 and a high-voltage side 953 with four rectifier switches 954 and a charging switch 957.

When the control unit 950 goes into backup mode, the control unit 950 initiates a fuse discharge of the capacitor 930, in which the control unit 950 closes the rectifier switch 954 and the charging switch 957 by means of control lines that are not shown. This closes a fuse circuit formed by the capacitor 930, the charge switch 957 and the rectifier switches 954, so that a fuse discharge current flows out of the capacitor 930 through the charge switch 957 and the rectifier switches 954. The charge switch 957 thus forms a fuse switch. In a first embodiment, all of the rectifier switches 954 are closed simultaneously. The electrical energy stored in the charged capacitor 930 is then dissipated in the rectifier switches 954 and the charging switch 957. A period of time of the discharging process can preferably be set by appropriate activation of the rectifier switches 954 by the control unit 950. In a further embodiment, the rectifier switches 954 are alternately closed crosswise in pairs, so that the fuse discharge current is converted by the switching converter 951 into a battery charging current on the low-voltage side 952. An electric battery connected to the low-voltage side 952 is then flowed through with current and charged. The electrical energy stored in the charged capacitor 930 is therefore stored in the battery and can be reused in a further operation of the setting tool. For this purpose, the switching converter 951 is formed as a bidirectional switching converter.

Otherwise, the construction and the operating principle of the setting tool coincide substantially with the setting tool shown in FIG. 1 and/or FIG. 2 and/or FIG. 3 and/or FIG. 4 and/or FIG. 5.

The invention has been described using a series of exemplary embodiments that are illustrated in the drawings and exemplary embodiments that are not illustrated. The individual features of the various exemplary embodiments are applicable individually or in any desired combination with one another, provided that they are not contradictory. It should be noted that the setting tool according to the invention can also be used for other applications.

The invention claimed is:

1. A setting tool for driving fastening elements into a substrate comprising a holder for holding a fastening element; a drive-in element for transferring a fastening element held in the holder into the substrate along a setting axis; a drive for driving the drive-in element toward the fastening element along the setting axis; and, a control unit configured to be operated in a normal mode and in a backup mode, wherein the drive comprises an electrical capacitor; and, an excitation coil, wherein the control unit is configured to carry out a rapid discharge of the capacitor in the normal mode to provide current that flows through the excitation coil to generate a magnetic field that accelerates the drive-in element toward the fastening element, and wherein the control unit is configured to carry out a fuse discharge of the capacitor in the backup mode to provide current that does not flow through the excitation coil, and wherein the control unit is configured to go into the backup mode upon detecting that the temperature of the surrounding area and/or of the setting tool exceeds a predetermined temperature.

2. The setting tool as claimed in claim 1, wherein the drive has a switching circuit, which comprises a discharge switch, the control unit being suitable for closing the discharge switch in the normal mode in order to bring about the rapid discharge, and the control unit comprises a fuse switch and is suitable for closing the fuse switch in the backup mode in order to bring about the fuse discharge.

3. The setting tool as claimed in claim 1, wherein the setting tool has a calculation program configured to detect the period of time during which the capacitor is already electrically charged.

4. The setting tool as claimed in claim 1, wherein the setting tool has a sensor configured to detect a mechanical load variable, and wherein the control unit is configured to go into the backup mode upon detecting that the mechanical load variable exceeds a predetermined maximum load variable.

5. The setting tool of claim 4, wherein the sensor comprises an acceleration sensor, and wherein the mechanical load variable comprises an acceleration of the setting tool.

6. The setting tool as claimed in claim 4, wherein the control unit is configured to go into backup mode upon detecting that a period of time during which the capacitor is already electrically charged exceeds a predetermined maximum period of time.

7. The setting tool as claimed in claim 1, wherein the control unit is configured to go into the backup mode upon detecting that the charging voltage of the capacitor exceeds a predetermined limit voltage.

8. The setting tool as claimed in claim 7, wherein the setting tool has a voltmeter configured to detect the charging voltage of the capacitor.

9. The setting tool as claimed in claim 7, wherein the control unit is configured to go into backup mode upon detecting that a period of time during which the capacitor is already electrically charged exceeds a predetermined maximum period of time.

10. The setting tool as claimed in claim 1, wherein the setting tool has a means for detecting a removal of a component of the setting tool, and wherein the control unit is configured to go into backup mode upon detecting that the component has been removed from the setting tool.

11. The setting tool of claim 10, wherein the means for detecting a removal of a component comprises a means for detecting a removal of a housing part or an electric battery.

12. The setting tool as claimed in claim 1, wherein the control unit has an electrical resistor, wherein, during the fuse discharge of the capacitor, current flows through the electrical resistor.

13. The setting tool as claimed in claim 12, wherein the electrical resistor comprises a resistor network.

14. The setting tool as claimed in claim 1, wherein the setting tool has an electric battery, wherein, during the fuse discharge of the capacitor current flows through the electric battery to charge the battery.

15. The setting tool as claimed in claim 14, wherein the control unit comprises a bidirectional switching converter, which converts a battery current into a capacitor charging current for a charging of the capacitor and converts a discharging current of the capacitor into a battery charging current for the fuse discharge of the capacitor.

16. The setting tool as claimed in claim 15, wherein the bidirectional switching converter comprises one or more rectifier switches, which are closed in order to bring out about the fuse discharge.

17. The setting tool of claim 1, comprising a hand-held setting tool.

18. The setting tool of claim 1, wherein the setting tool has a temperature sensor that detects the temperature of the excitation coil, and wherein the control unit is configured to go into backup mode upon detecting that the temperature of the excitation coil exceeds the predetermined temperature.

19. The setting tool as claimed in claim 1, wherein the control unit is configured to go into backup mode upon detecting that a period of time during which the capacitor is already electrically charged exceeds a predetermined maximum period of time.

* * * * *